384-108 SR
12/2/86 OR H 000174

United States Statutory Invention Registration [19]

[11] Reg. Number: H174
[43] Published: Dec. 2, 1986

Mermagen

[54] HIGH SPIN COMPOUND AIR BEARING

[75] Inventor: William H. Mermagen, Havre de Grace, Md.

[73] Assignee: The United States of America as represented by the Secretary of the Army, Washington, D.C.

[21] Appl. No.: 797,065

[22] Filed: Nov. 12, 1985

[51] Int. Cl.[4] ..... F16C 32/06
[52] U.S. Cl. ..... 384/108; 384/100
[58] Field of Search ..... 384/99, 100, 107–113, 384/114–120, 192, 193, 206, 287, 901; 308/DIG. 4

[56] References Cited

U.S. PATENT DOCUMENTS

| | | | |
|---|---|---|---|
| 2,869,901 | 1/1959 | Czwerwinski | 384/99 X |
| 2,998,999 | 9/1961 | Morser et al. | 384/108 |
| 3,005,666 | 10/1961 | Morser et al. | 384/108 |
| 3,302,048 | 1/1967 | Gray | 384/108 X |
| 3,351,394 | 11/1967 | Hooker | 384/108 X |
| 3,455,155 | 7/1969 | Greenberg et al. | 384/99 X |
| 4,184,720 | 1/1980 | Zacherl | 384/109 |

FOREIGN PATENT DOCUMENTS

| | | | |
|---|---|---|---|
| 192555 | 2/1967 | U.S.S.R. | 384/108 |
| 52054 | 4/1977 | Japan | 384/108 |

*Primary Examiner*—Thomas H. Tarcza
*Assistant Examiner*—Linda J. Wallace
*Attorney, Agent, or Firm*—Anthony T. Lane; Harold H. Card, Jr.; Michael C. Sachs

[57] ABSTRACT

An air bearing for use with flight simulators or spin stabilized projectiles having a primary axis of rotation. The device includes a fixedly mounted frame. In the frame is a hemispherical first stator defining an interior spherical space having a center on the primary axis of rotation of the projectile. A hemispherical first rotor is positioned about the center in said spherical space and is uniformly separated from the first stator by a first air gap. A cylindrical second stator is mounted on the first rotor and defines an interior cylindrical space having an axis co-existent with the primary axis. A cylindrical second rotor is positioned about the primary axis in said cylindrical space and is separated from the second stator by a second air gap. An air supply means is positioned to supply air to the first air gap in an amount sufficient to support said first rotor in said first stator and to supply air to said second air gap in an amount sufficient to support said second rotor in said second stator. Sleeve means are mounted on said second rotor for mounting a projectile to the second rotor and positioning the rotational axis of the projectile on the primary axis. Finally, drive means for rotating the projectile about the primary axis are provided.

20 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

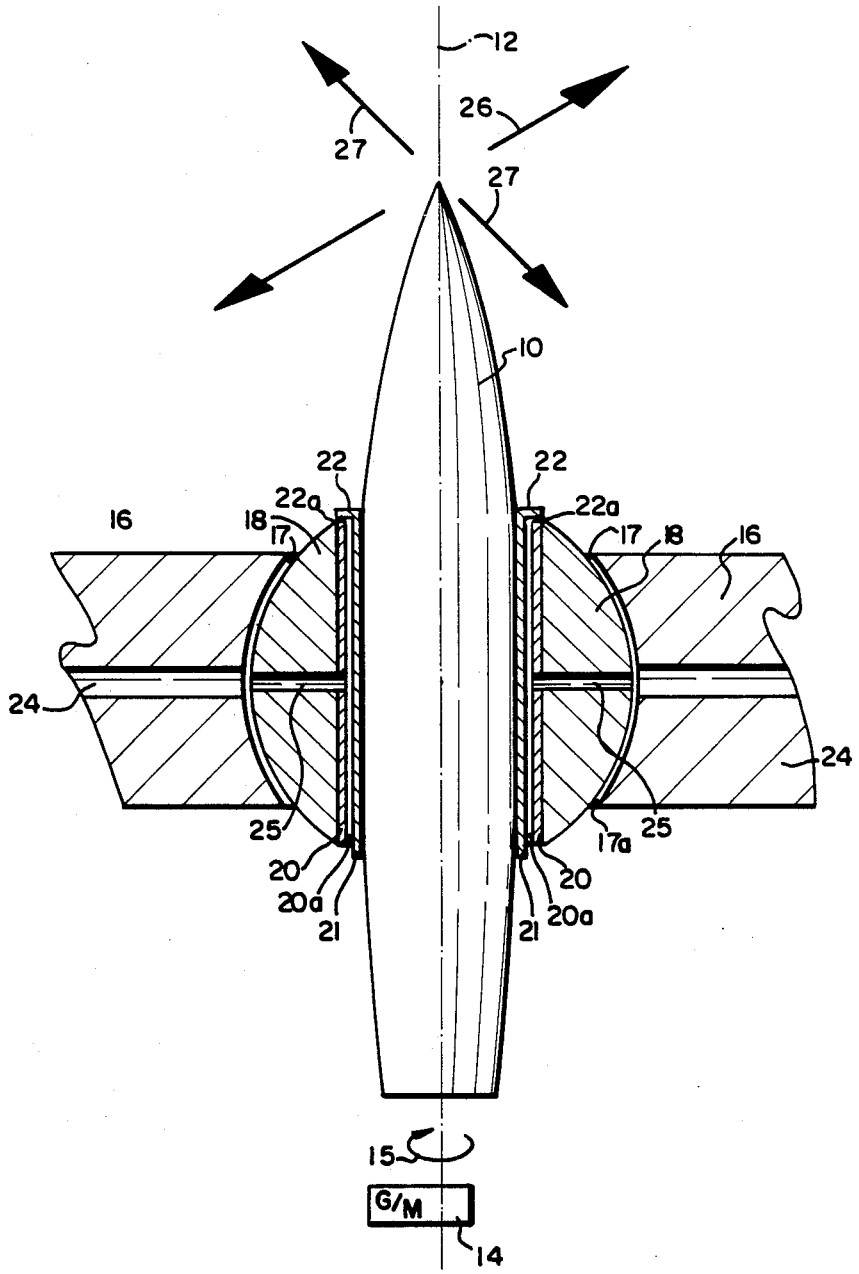
12
26
27
27
10
22
22
22a
22a
16
18
17
17
18
16
24
24
25
25
17a
20
20
20a
20a
21
21
15
G/M
14

HIGH SPIN COMPOUND AIR BEARING

GOVERNMENTAL INTEREST

The invention described herein may be made, used, or licensed by the Government for governmental purposes, without the payment to me of any royalties thereon, or therefor.

BACKGROUND OF THE INVENTION

Field of The Invention

The present invention relates to the apparatus used for determining the gyroscopic stability of spinning projectiles in which 3 degree of freedom measurements are made of forces and movements. Projectiles usually require high spin rates to obtain the required gyroscopic stability in flight. This motion of a spinning projectile can at present time only be successfully determined by actual projectile firings from a gun. However, this method does not permit closely controlled experiments, nor does it provide for precision measurements over any degree of the range of performance.

Forced motion flight simulators can operate on a projectile so that it is spun and driven in pitch and yaw directions. The spin rates achievable with such a device, however, are much less than those possible with an actual full service spin rate of up to 9,000 revolutions per minute.

Some experiments have been performed using a 3 degree, forced mode fixture to develop and measure forces and moments. The use of ball-bearing races introduce frictional variations which result in significant errors.

Recently, a new development has been attempted in which a spinning projectile was supported by a large spherical air bearing, with 3 degrees of angular freedom, which is positioned externally to the projectile. The geometric center of the bearing is at the combined center of mass of the projectile and the male part of the bearing. This fixture was impractical, however, because projectiles require high spin rates to obtain the required gyroscopic stability in flight. Therefore the tangential velocity differencial between the male and female parts of the support bearing, particularly for large projectiles, became overwhelming. The diameter of the spherical air bearing must be at least twice that of the projectiles it supports so as to prevent unrealistic limitations to the projectile yawing motion during spin down.

Accordingly, it has not been possible to operate on large caliber projectiles of from less than 75 mm to greater than 120 mm which operate at full service spin rates of up to 9,000 revolutions per minute. It is necesary during this high full service spin rate to provide for large amplitude pitching of up to 15 degrees and yawing motion at a service rate of up to 15 Hertz. The tangential velocity of the spherical air bearing does not permit anywhere near the approximation of these values.

Accordingly, it would be a great advantage to the art if a device could be provided which would permit the development of and measurement of gyroscopic stability effects in spinning projectiles and the interaction between projectiles and their pay loads. It is particularly desireable that the device be capable of operating at speeds up to 9,000 RPM for full size artillery projects up to and exceeding the 155 mm artillery projectile. It is particularly desireable that a simulation device be provided so that the motion of the projectile is natural and not forced, so that the interaction between the projectile and the driving system would not be too severe to permit accurate measurements of projectiles weighing upwards of 100 lbs.

SUMMARY OF THE INVENTION

It has now been discovered that an air bearing for use with flight simulators for spin stabilized projectiles having a primary axis of rotation can be provided.

The device includes a fixedly mounted frame and a hemispherical first stator mounted on the frame and defining an interior spherical space having a center on the primary axis. A hemispherical first rotor is positioned about the center in the spherical space and is uniformly separated from the first stator by a first air gap. A cylindrical second stator is mounted on the first rotor and defines an interior cylindrical space having an axis co-existant with the primary axis. A cylindrical second rotor is positioned about the primary axis in that cylindrical space such that the second rotor is uniformly separated from the second stator by a second air gap. An air supply means is provided in position to supply air to the first air gap in an amount sufficient to support the first rotor in said first stator and to supply air to the second air gap in an amount sufficient to support the second rotor in the second stator. Sleeve means are mounted on said second rotor for mounting a projectile to the second rotor and positioning the rotating axis of the projectile on the primary axis. Drive means are provided for rotating the projectile about its primary axis at a rate of rotation simulating the actual projectile firing from a gun. Thus, the projectile is supported by air in the first and second air gaps during rotation thereof to permit movement of the projectiles with respect to the primary axis. Pitch and yaw deviations can be observed and measured as desired.

In a preferred embodiment the stators and rotors are manufactured from machined aluminum. The drive means, which is preferrably a gyro motor, is capable of spinning a projectile about its primary axis at rates of up to and exceeding 9,000 RPM. The air supply means is adapted to supply air to the first and second air gap at pressures sufficient to maintain the uniform distance between each of the rotor and stator pairs. Air supply is normally at a pressure up from about 1 to about 100 psi, with a preferred range being in the range of about 20 to about 60 psi.

In a preferred embodiment, the air supply means include a first port means in said first stator communicating between a source of air under pressure and the first air gap. The preferred air supply means further include a second port means in the second stator communicating between the first air gap and the second air gap to supply air under pressure from the first air gap to the second air gap. A preferred method for providing these port means is where the first port means comprises a first plurality of air ports through said first stator radially extending towards the primary axis and the second port means comprises a second plurality of air ports through the first rotor and second stator radially extending towards the primary axis, such that the first plurality of air ports and the second plurality of air ports are axially aligned with respect to each other prior to movement of said projectile due to rotation thereof.

In another embodiment, the sleeve means provides an extended portion which is capable of resting on the cylindrical rotor prior to the operation of the device. Upon operation of the device, air pressure in the second air gap raises the extended portion of the sleeve means away from the cylindrical rotor and acts as an additional air bearing. Thus operation of the device is totally absent from any metal to metal contact.

BRIEF DESCRIPTION OF THE DRAWING

The foregoing embodiments of this invention and the particular features of the various alternative embodiments will be more clearly understood from the following detailed description thereof, which is read in conjunction with the accompanying drawing, in which:

The FIGURE is a sectioned view of the preferred embodiment of the present invention.

DETAILED DESCRIPTION OF THE INVENTION

As shown in the figure, a projectile 10 is positioned to rotate about its primary axis 12 and can be driven by gyro motor 14 in a rotation about axis 12 such as shown by arrow 15. Rotation speeds may be as high as 9,000 RPM or higher so that in flight rotation of the projectile can be fully simulated by the present device. Because of the construction of the present apparatus, there is no practical limit to the rotational speed of the projectile, and any of the high rotational velocities can be simulated by use of the appropriate gyro motor 14. The projectile 10 may be of any size, but this invention is particularly suited to the heavier projectiles such as those of 75 mm size up to the larger 155 mm projectiles. Total payload weight can exceed 100 pounds.

Mounted to the ground, not shown, is a large frame 16 which is shown cut away at its ends but which is understood to be attached to normal support members. A suitable support frame 16 can be cut from heavy gauge plate steel or other metals as desired.

Mounted on the frame 16 and in this embodiment cut into the frame 16 is a hemispherical first stator 17 which defines an interior spherical space having a center located on the primary axis 12. The surface of the hemispherical first stator 17 is spherical in shape such that the radii from the sphere all converge upon the center point which is located on axis 12. The rotor face 17 defines this center spherical space. Located inside the spherical space defined by the stator 17 is a hemispherical first rotor 18 which is positioned about the center of the spherical space and defined on the axis 12 such that the first rotor 18 is uniformly separated from the first stator 17 by a first air gap **17-*a*. This air gap 17-*a* is uniform around the junction of the stator 17 and rotor 18**.

On the inside of rotor 18 is positioned a cylindrical second stator 20 which defines an interior cylindrical space having an axis co-existant with the primary axis 12. This cylindrical stator 20 defines this interior cylindrical space through the entire center of the hemispherical rotor 18. Positioned within the interior cylinder space defined by second stator 20 is a cylindrical second rotor 21 such that the second rotor 21 is uniformly separated from the second stator 20 by a second air gap **20-*a*. The second rotor 21 functions additionally as a sleeve means for mounting the projectile to the second rotor face and positioning the rotational axis 12 of the projectile 10 in alignment with the primary axis 12. This second rotor and sleeve 21 has an extended corner edge 22 which permits the projectile 10 to rest on the rotor 18 and cylindrical stator 20 when the device is not in operation. Thus, prior to operation, the projectile 10 having the sleeve and second rotor 21 is dropped through the cylinder defined by the cylindrical stator 20 so as to permit extension 22 to rest on the stator 20 held by the rotor 18**.

An air supply means is positioned to supply air to the first air gap **17-*a* and to the second air gap 20-*a* so as to support the first rotor 18 in the first stator 17 and to support the second rotor 21 in the second stator 20. Air is supplied to the first gap 17-*a* via a plurality of air ports 24 which are aligned radially extend towards the primary axis 12. Aligned with the first set of ports 24 are a plurality of second ports 25 which are located in the hemispherical rotor 18 and communicate with air gap 20-*a*. These second ports 25 are radially extending toward the primary axis 12 and the ports 25 are axially aligned with the ports 24 at least prior to movement of the projectile by rotation thereof. It is understood that rotation of the rotor 18 with respect to the stator 17 will cause the ports 24 and 25** to be out of alignment to some degree when the device is being operated.

The above described device employs the use of the compound air bearing in gaps **17-*a* and 20-*a* in a unique manner which permits spin about axis 12 at extremely high rates. As the air supply is provided through ports 24 and 25 to pressurize the air gap 17-*a* and 20-*a*, another air gap 22-*a* is formed between the extension 22 of sleeve 21 and the stator 20 attached to rotor 18. This air gap 22-*a* lifts the projectile 10 being held by sleeve 21 into full air suspension. Operation of the gyro motor 14 at extremely high spin rates causes simulation of the device in flight. Deviation of the projectile from axis 12 in directions of either arrows 26 or 27**, for example, permits measurements of relatively large amplitude pitching of up to 15 degrees or more and yawing motion at service rates of up to 15 Hertz or more. This is accomplished while the projectile or large caliber device is spinning at a full service spin rate of up to 9,000 RMP or more.

The present invention eliminates the problem of surpressing the severity of tangential velocity when a single spherical bearing is provided. By dividing the design of the bearing support into two parts, employing this unique bearing within a bearing concept, tangential velocity problems are minimized. There is a minimum diameter cylindrical air bearing located over the projectile body which assumes most of the high speed spin requirements. This cylindrical air bearing which is located within the large spherical air bearing assumes all of the coning motion requirements with perhaps some residual spill over spin. The cylindrical air bearing, with its smaller radius, less area and load will develop a significantly smaller portion of the total spin down friction torque. Thus, the differential tangential velocity problem with a spinning large spherical air bearing will be reduced by about 90% or more because of the use of the cylindrical air bearing. Thus this tangential velocity is easy to manage.

Having thus described the invention, what is claimed is:

1. An air bearing for use with flight simulators for spin stabilized projectiles having a primary axis of rotation, comprising:

a fixedly mounted frame;

a hemispherical first stator mounted on said frame and defining an interior spherical space having a center on said primary axis;

a hemispherical first rotor positioned about said center in said spherical space, said first rotor being uniformly separated from said first stator by a first air gap;

a cylindrical second stator mounted on said first rotor and defining an interior cylindrical space having an axis co-existent with said primary axis;

a cylindrical second rotor positioned about said primary axis in said cylindrical space, said second rotor being uniformly separated from said second stator by a second air gap;

air supply means positioned to supply air to said first air gap in an amount sufficient to support said first rotor in said first stator and to supply air to said second air gap in an amount sufficient to support said second rotor in said second stator;

sleeve means on said second rotor for mounting a projectile to said second rotor in positioning the rotational axis of said projectile on said primary axis and drive means for rotating said projectile about said primary axis

2. The device of claim 1 wherein said first and second rotors and first and second stators are machined aluminum.

3. The device of claim 1 wherein the said drive means is adapted to rotate said projectile at speeds up to at least 9,000 RPM.

4. The device of claim 1 wherein said air supply means is adapted to supply air at a pressure of from about 1 to about 100 psi.

5. The device of claim 4 wherein said air supply means provides air at a pressure of from about 20 to about 60 psi.

6. The device of claim 4 wherein said air supply means includes first port means in said first stator communicating between a source of air under pressure and said first air gap.

7. The device of claim 6 wherein said air supply means include second port means in said second stator communicating between said first air gap and said second air gap to supply air under pressure from said first air gap to said second air gap.

8. The device of claim 7 wherein said first port means comprises a first plurality of air ports through said first stator radially extending towards said primary axis and said second air ports means comprises a plurality of air ports through said first rotor and second stator radially extending towards said primary axis.

9. The device of claim 8 wherein said first plurality of air ports and second plurality of air ports are axially aligned with respect to each other prior to movement of said projectile due to rotation thereof.

10. The device of claim 7 which further includes extention means on said sleeve positioned to define a corner air gap between said sleeve means and said cylindrical stator, said corner air gap being in communication with said second air gap and receiving air therefrom.

11. In an air bearing device for use with flight simulators to spin stabilized projectiles having a primary axis of rotation in which a projectile is rotated about its primary axis, said device having a frame and a drive means for rotating said projectile about its primary axis, the improvement comprising:

a hemispherical first stator mounted on said frame and defining an interior spherical space having a center on said primary axis;

a hemispherical first rotor positioned about said center in said spherical space, said first rotor being uniformly separated from said first stator by a first air gap;

a cylindrical second stator mounted on said first rotor and defining an interior cylindrical space having an axis co-existent with said primary axis;

a cylindrical second rotor positioned about said primary axis in said cylindrical space, said second rotor being uniformly separated from said second stator by a second air gap;

air supply means positioned to supply air to said first air gap in an amount sufficient to support said first rotor in said first stator said to supply air to said second air gap in an amount sufficient to support said second rotor in said second stator; and sleeve means on said second rotor for mounting a projectile to said second rotor in positioning the rotational axis of said projectile on said primary axis.

12. The device of claim 11 wherein said first and second rotors and first second stators are machined aluminum.

13. The device of claim 11 wherein the said drive means is adapted to rotate said projectile at speeds up to at least 9,000 RPM.

14. The device of claim 11 wherein said air supply means is adapted to supply air at a pressure of from about 1 to about 100 psi.

15. The device of claim 14 wherein said air supply means provides air at a pressure of from about 20 to about 60 psi.

16. The device of claim 14 wherein said air supply means includes first port means in said first stator communicating between a source of air under pressure and said first air gap.

17. The device of claim 16 wherein said air supply means include second port means in said second stator communicating between said first air gap and said second air gap to supply air under pressure from said first air gap to said second air gap.

18. The device of claim 17 wherein said first port means comprises a first plurality of air ports through said first stator radially extending towards said primary axis and said second air ports means comprises a plurality of air ports through said first rotor and second stator radially extending towards said primary axis.

19. The device of claim 18 wherein said first plurality of airports and second plurality of air ports are axially aligned with respect to each other prior to movement of said projectile due to rotation thereof.

20. The device of claim 17 which further includes extention means on said sleeve positioned to define a corner air gap between said sleeve means and said cylindrical stator, said corner air gap being in communication with said second air gap and receiving air therefrom.

* * * * *